Aug. 27, 1929.  F. W. HARRYHAUSEN  1,726,149
VEHICLE LUGGAGE CARRIER
Filed July 7, 1927   2 Sheets-Sheet 1

Inventor
F. W. Harryhausen
By Lacey & Lacey, Attorneys

Aug. 27, 1929. F. W. HARRYHAUSEN 1,726,149
VEHICLE LUGGAGE CARRIER
Filed July 7, 1927 2 Sheets-Sheet 2
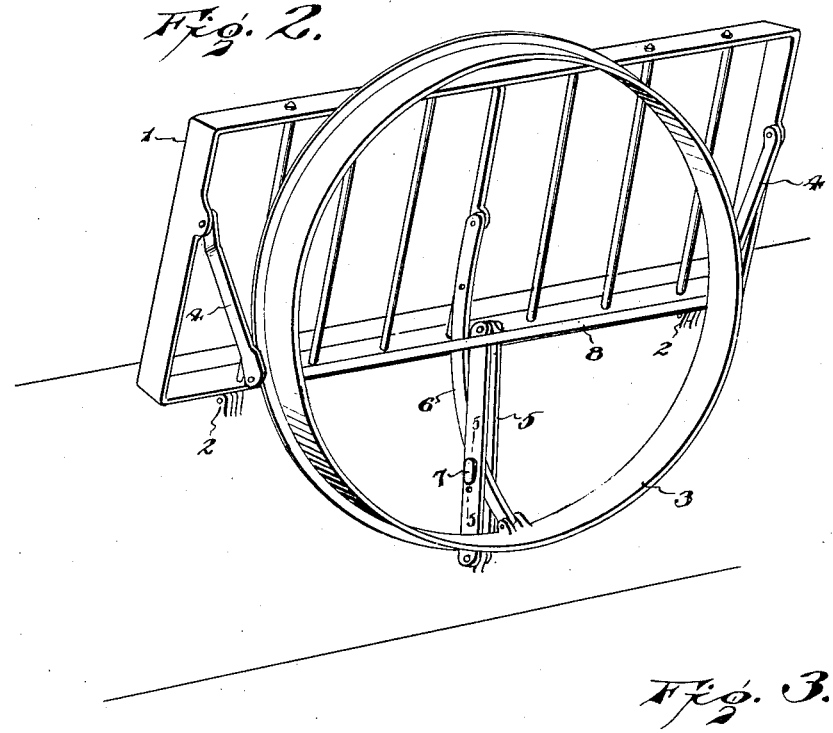
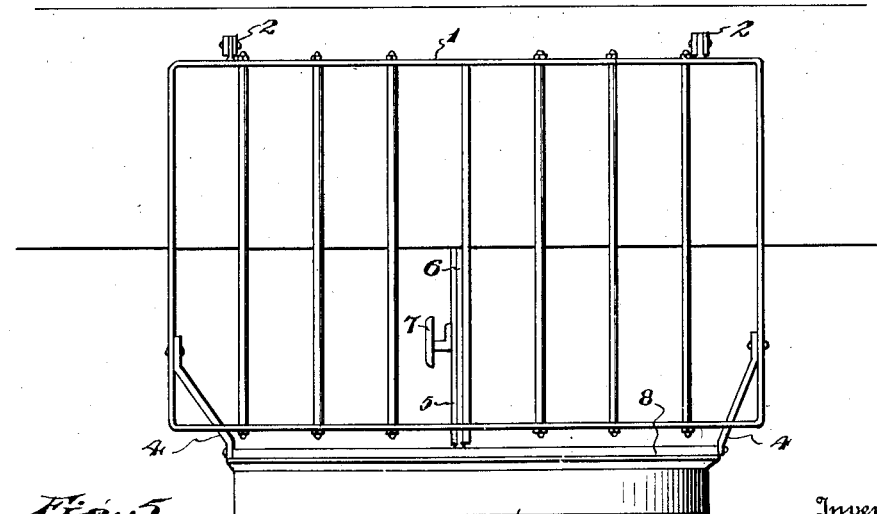
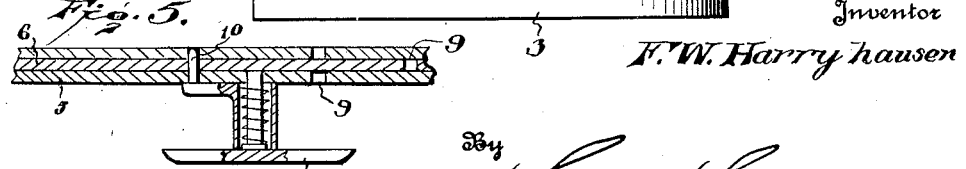

Patented Aug. 27, 1929.

1,726,149

UNITED STATES PATENT OFFICE.

FREDERICK W. HARRYHAUSEN, OF INGLEWOOD, CALIFORNIA.

VEHICLE LUGGAGE CARRIER.

Application filed July 7, 1927. Serial No. 204,039.

Pneumatic tired vehicles, such as automobiles, are generally equipped with holders, or carriers, for spare tires and these holders are for the most part fixed and attached to the rear of the vehicle.

The present invention provides a tire carrier which is adjustably mounted in the rear of the vehicle to admit of the space between it and the rear of the vehicle body being utilized to receive a trunk, or other luggage.

The invention furthermore provides a rack and tire carrier, which are pivotally connected to the vehicle, and intermediate connections between the parts whereby they move in unison, so that when the rack is lowered the tire carrier moves away from the vehicle body and forms a guard in the rear of the rack, and when the rack is folded the tire carrier moves forwardly to occupy a position as close to the vehicle body as possible.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 3 is a top plan view.

Figure 4 is a detail sectional view, the full lines showing the position of the parts when the rack is lowered, and the dotted lines indicating the position of the parts when the rack is folded.

Figure 5 is an enlarged detail sectional view on the line 5—5 of Figure 2.

Corresponding and like parts are referred to in the following description and designated in the several views of the drawings by like reference characters.

The vehicle illustrated is shown to demonstrate the application of the invention, and is of the automobile type for which the invention is chiefly intended. The numeral 1 designates a rack which may be of any approved construction adapted to support a trunk or other luggage, and is shown of rectangular outline and pivoted at one side to the vehicle, as indicated at 2. The rack is adapted to swing upwardly, as indicated most clearly by the dotted lines in Figure 4, so as to occupy a position as close to the rear of the vehicle body as possible. The pivotal connection 2 may be effected in any determinate way. In the preferable construction the rack comprises an oblong frame of rectangular outline, and a plurality of rods supported at their ends in the longitudinal members of the frame. The rack thus formed is light, strong and open.

Figure 1:
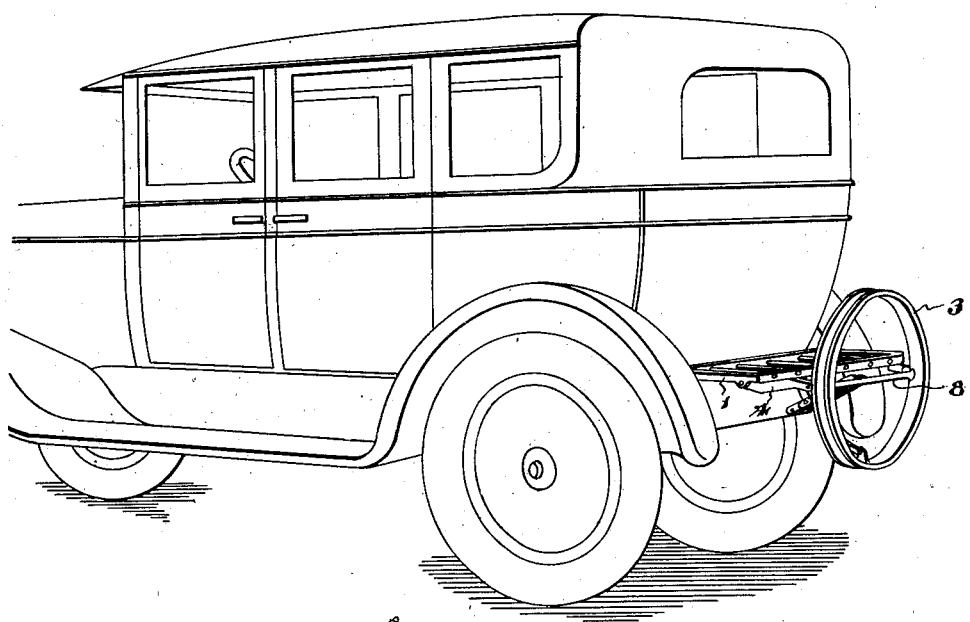
Figure 1 is a rear perspective view of an automobile provided with a luggage carrier embodying the invention, the rack being shown in lowered position to receive a trunk or other luggage.
Figure 2:
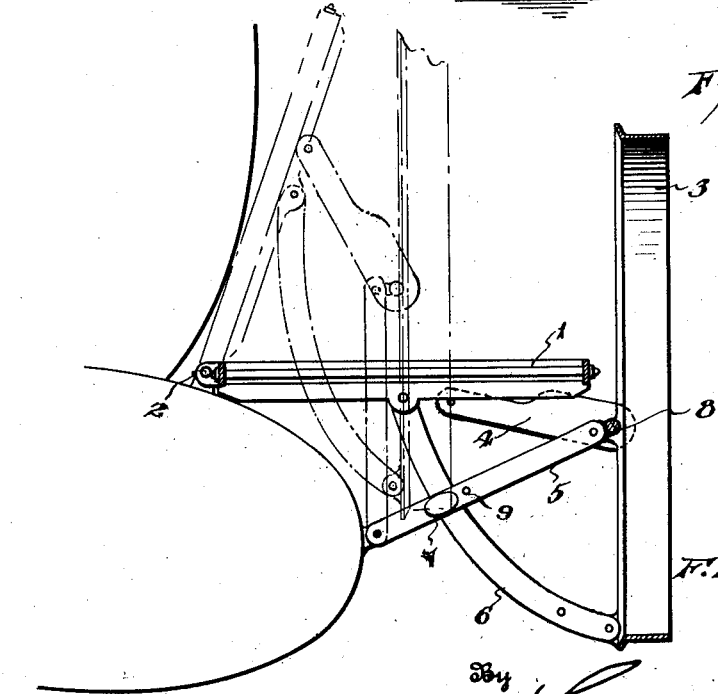
Figure 2 is a rear perspective view of the luggage carrier, the parts being folded and shown on a larger scale.

The tire carrier 3 is of usual construction and consists of a ring and is mounted to move forwardly and upwardly and is connected to the rack 1 by links 4 and to the vehicle and rack by links 5 and 6 which cross and are adapted to be connected at the point of crossing by means of a catch 7 or analogous fastening. The link 5 comprises spaced members between which the link 6 passes, and both links 5 and 6 are provided in their length with openings 9 to coact with the fastening 7, for the rack 1 and tire carrier 3 in their extreme positions. A rod 8 extends from one side to the other of the tire carrier, and the links 4 and 5 are connected at one end thereto, the links 4 being connected to the ends of the rod 8 and the link 5 being connected to said rod intermediate its ends. The links 4 are oppositely inclined and are adapted to extend beneath the rear corners of the rack 1 when the latter is lowered to the limit of its movement to form supporting means therefor when a trunk or other heavy luggage is placed thereon. As indicated most clearly in Figures 1 and 4, the tire carrier 3 is located adjacent to and in the rear of the rack 1 and projects thereabove to form a guard when said rack is in its lowest position. The tire carrier 3 moves bodily when the rack 1 is folded or unfolded and moves upwardly and forwardly as the rack is folded and drops rearwardly and downwardly as the rack is lowered.

It will be understood from the foregoing taken in connection with the accompanying drawings that the invention provides a tire carrier and a trunk rack wherein the rack is folded so as to be out of the way when not required for use while at the same time admitting of the tire carrier occupying a position close to the rear of the vehicle body, and wherein the rack may be lowered to receive luggage without intereference therewith of the tire carrier, the latter being utilized as a guard to protect the luggage and prevent displacement thereof rearwardly from the rack.

The catch 7 is spring actuated and reversible, as indicated most clearly in Figure 5, and includes a pin 10 and a rotatable and outwardly movable part to which said pin is attached. In one position of the rack the pin 10 passes through registering openings 9 formed in the links 5 and 6 and in the other extreme position of the rack the pin passes through the other set of openings 9 which have been brought into registering position.

Having thus described the invention, I claim:

1. The combination with a vehicle, of a folding rack, a movable tire carrier, crossing links pivoted at one end to the tire carrier and pivoted at their opposite ends to respectively, the rack and vehicle, and means for adjustably connecting the links at their point of crossing.

2. The combination with a vehicle, of a folding rack, a movable tire carrier, crossing links pivoted at one end to the tire carrier and pivoted at their opposite ends to, respectively, the rack and vehicle, and means for adjustably connecting the links at their point of crossing, and other links pivotally connecting the tire carrier with the rack and adapted to form supporting means for the latter when in lowered position.

3. The combination with a vehicle, of a rack pivoted to fold upwardly in the rear of the vehicle body, a movable tire carrier, links pivotally connecting the ends of the rack to opposite sides of the tire carrier and adapted to extend beneath and support the rack when extended, crossing links pivoted at one end to the tire carrier and having their opposite ends pivotally connected to the rack and vehicle respectively, and means connecting the links at their point of crossing.

Intestimony whereof I affix my signature.

FREDERICK W. HARRYHAUSEN. [L. S.]